United States Patent
Singh et al.

(10) Patent No.: US 7,384,618 B2
(45) Date of Patent: Jun. 10, 2008

(54) PURIFICATION OF NITROGEN TRIFLUORIDE

(75) Inventors: Rajiv R. Singh, Getzville, NY (US); Martin R. Paonessa, Niagara Falls, NY (US); Matthew H. Luly, Hamburg, NY (US); David F. Orlowski, Lancaster, NY (US)

(73) Assignee: Honeywell International Inc., Morristown, NJ (US)

( * ) Notice: Subject to any disclaimer, the term of this patent is extended or adjusted under 35 U.S.C. 154(b) by 164 days.

(21) Appl. No.: 11/100,684

(22) Filed: Apr. 7, 2005

(65) Prior Publication Data

US 2006/0228285 A1 Oct. 12, 2006

(51) Int. Cl.
*B01D 53/04* (2006.01)
*C01B 21/083* (2006.01)

(52) U.S. Cl. .................... 423/406; 95/116; 95/131; 96/108

(58) Field of Classification Search .............. 423/406; 95/131; 96/108
See application file for complete search history.

(56) References Cited

U.S. PATENT DOCUMENTS

| | | | | |
|---|---|---|---|---|
| 3,125,425 | A | 3/1964 | Richmond | 55/22 |
| 4,091,081 | A | 5/1978 | Woytek et al. | 423/406 |
| 5,069,690 | A | 12/1991 | Henderson et al. | 55/67 |
| 5,069,887 | A | 12/1991 | Suenaga et al. | 423/240 |
| 5,759,237 | A * | 6/1998 | Li et al. | 95/41 |
| 7,022,160 | B2 * | 4/2006 | Igumnov et al. | 95/131 |
| 2002/0001556 | A1 | 1/2002 | Sakurai et al. | 423/244.08 |
| 2002/0001560 | A1 * | 1/2002 | Miller et al. | 423/406 |
| 2002/0023540 | A1 | 2/2002 | Abe et al. | |
| 2005/0163695 | A1 * | 7/2005 | Hart et al. | 423/406 |

FOREIGN PATENT DOCUMENTS

JP 10259011 9/1998

OTHER PUBLICATIONS

Martin Harper, "Sorbent Trapping of Volatile Organic Compounds From Air", Journal of Chromatography A, 885 (2000) 129-151.
A. Monod, et al., "Methods for Sampling and Analysis of Tropospheric Ethanol in Gaseous and Aqueous Phases", Chemosphere 52 (2003) 1307-1319.
J. Massone, Chem. Ing. Tech. 41, No. 12, 695-742 (1969), Herstellung und Reiningung von Stickstofftrifluorid in einer Versuchsanlage (Preparation and Purification of Nitrogen Trifluoride in an Experimental Unit) (see attached translation), no month.
Nippon Sanso Corp "Method of Refining Nitrogen Trifluoride" JP 2002 068717 dated Mar. 8, 2002 abstract.
Alltech Associates Inc "Carbosphere" datasheet D5680 dates 1997 XP002385704, no month.

* cited by examiner

*Primary Examiner*—Wayne A. Langel
(74) *Attorney, Agent, or Firm*—Erika S. Wilson

(57) ABSTRACT

A process and system for adsorption purification of $NF_3$ wherein a crude product containing $NF_3$ and impurities such as $CF_4$ is brought into contact with a polyacrylonitrile-based carbon molecular sieve so that at least a portion of one or more impurities are adsorbed by the sieve without a significant adsorption of the $NF_3$.

16 Claims, 1 Drawing Sheet

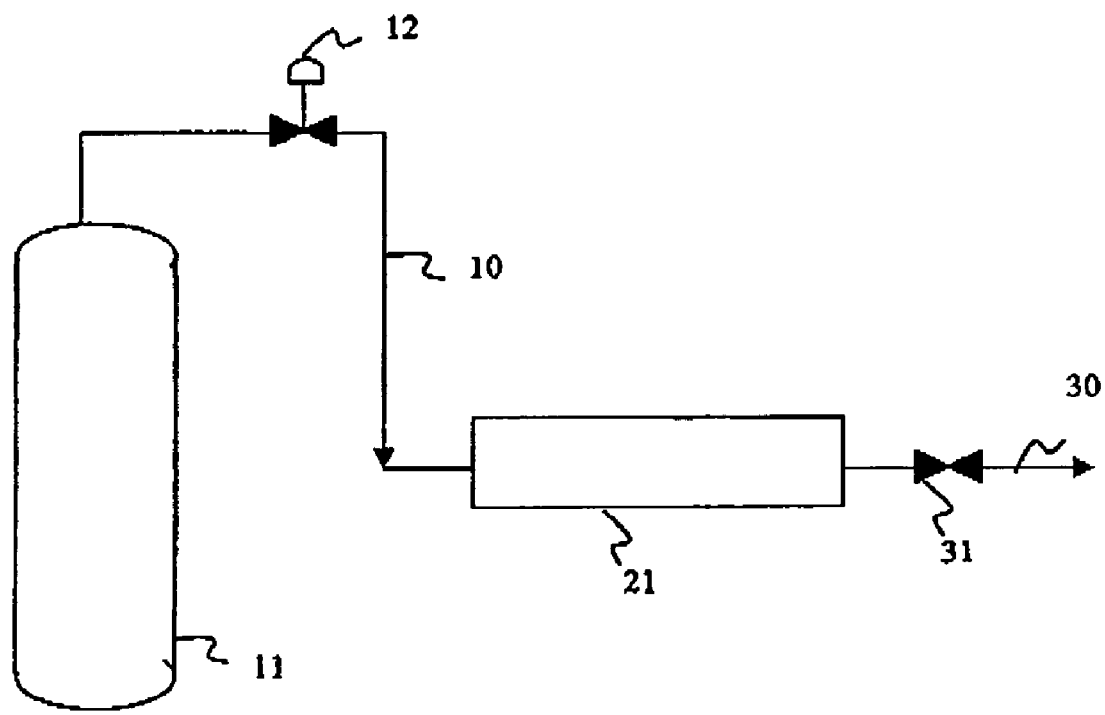

PURIFICATION OF NITROGEN TRIFLUORIDE

FIELD OF INVENTION

This invention relates to methods for obtaining high purity nitrogen trifluoride ($NF_3$). In particular, the invention relates to a $NF_3$ purification process that is capable of producing $NF_3$ with low levels of deleterious impurities, including carbon tetrafluoride ($CF_4$).

BACKGROUND OF INVENTION

Nitrogen trifluoride is widely used in the manufacture of semiconductor materials, in high energy lasers, and in chemical vapor deposition processes. Certain manufacturing processes, such as etching semiconductor material, require a very pure source of $NF_3$ because even small amounts of impurities, especially $CF_4$, can result in the formation of solid residues of carbon or silicon carbide which can cause problems during semiconductor etching operations. To be useful in most electronics manufacturing processes, $NF_3$ must be 99.9% to 99.999% pure.

Nitrogen trifluoride can be manufactured by several processes including electrolysis of melted ammonium acid fluorides, reacting fluorine gas with ammonium bifluoride, and reacting fluorine gas with ammonium cryolite. Most commercial $NF_3$ manufacturing processes involve elemental fluorine ($F_2$) as a reactant. Elemental fluorine is typically manufactured via an electrolytic process that utilizes carbon electrodes. During this process, a small portion of the $F_2$ generated at the carbon electrodes often reacts with the electrodes creating $CF_4$. As a result, the $F_2$ used in $NF_3$ manufacturing processes generally contains at least some $CF_4$ impurities. Additionally, any other carbonaceous impurity in the $F_2$ process or subsequent $NF_3$ process can also react with $F_2$ to create $CF_4$.

U.S. Pat. No. 4,091,081 discloses an $NF_3$ manufacturing process via the reaction $4NH_3+3F_2 \rightarrow NF_3+3NH_4F$ which is run in an ammonium acid fluoride melt. If the starting $F_2$ reactant contains 1 mole % $CF_4$, the product $NF_3$ could contain up to 3 mole % $CF_4$. The actual $CF_4$ content in commercial $F_2$ manufacturing processes varies depending on the cell design, operation, and purpose for which the $F_2$ is generated. Typically, $CF_4$ impurities might vary from 10 ppm to 1% or higher.

Other impurities found in commercially manufactured $NF_3$ include $N_2$, $O_2$, $CO_2$, $H_2O$, $CH_4$, HF, $SF_6$, $N_2O$, and CO.

Unfortunately, it is difficult to separate $CF_4$ from $NF_3$. In fact, the removal of $CF_4$ from $NF_3$ has been described as "practically impossible". J. Massonne, CHEMIE INGENIEUR TECHNIK, v. 41, N 12, p. 695 (1969). The complexity of separating $CF_4$ from $NF_3$ is due to each compound's low chemical reactivity at normal temperatures, a small difference in the size of their molecules, and a small difference in their boiling points (−128° C. and −129° C. for $CF_4$ and $NF_3$, respectively). GMELIN HANDBOOK, 1986, v. pp. 179-180. The closely related boiling points of $NF_3$ and $CF_4$ make bulk separation of these two compounds by distillation impractical. In addition, the dipole moments and the heats of adsorption of $NF_3$ and $CF_4$ are sufficiently close so that bulk recovery of $NF_3$ from conventional bulk adsorption technologies is not feasible.

Nevertheless, various methods of removing $CF_4$ from $NF_3$ are known in the art, although each has significant disadvantages. For example, U.S. Pat. No. 3,125,425 discloses a process of separating gaseous fluorides by gas chromatography techniques wherein a silica gel having an average pore diameter of 22 Å is mixed with a liquid low-molecular chlorotrifluoroetylene polymer and then used to create phase separation. However, this process suffers from such disadvantages as low efficiency, high consumption of helium or other inert gas (up to 500 liters per liter of $NF_3$ processed), and low effectiveness of the separation when the concentration of impurities is smaller than 1 volume percent. In fact, the purity of the $NF_3$ obtained by this process can not exceed 99 volume percent and, therefore, is inadequate for producing $NF_3$ for the electronics industry.

Other techniques have been developed to obtain $NF_3$ with a purity as high as 99.99%. These methods separate $NF_3$ from $CF_4$ using a zeolite adsorbent that specifically adsorbs $NF_3$. For example, the method disclosed in U.S. Pat. No. 5,069,690 utilizes a gas-solid chromatography technique that involves passing discrete pulses of a mixture of $NF_3$ and $CF_4$ in a continuous flow of an inert carrier gas through a porous bed of an molecular sieve adsorbent consisting of a hydrothermally treated zeolite 5A or chabazite (hydrated calcium aluminum silicate). The molecular sieve in this process kinetically adsorbs $NF_3$ more readily than $CF_4$. Although this process separates $NF_3$ from $CF_4$, to recover the $NF_3$ product, the adsorbent must first be removed from the gas composition containing $CF_4$ and then the $NF_3$ must be extracted from the adsorbent.

Another example of a method utilizing a zeolite molecular sieve is described in U.S. Pat. No. 5,069,887. In this reference, gaseous $NF_3$ containing $CF_4$ is contacted with a crystalline porous synthetic zeolite having an effective pore size of 4.9 Å at a temperature of −50° to 10° C., wherein the $NF_3$ is adsorbed by the zeolite. The remaining gases containing $CF_4$ are subsequently displaced from the adsorbent, and then the $NF_3$ is desorbed from the sieve resulting in a purified $NF_3$ product. The synthetic zeolite of this molecular sieve has a chemical composition represented by the empirical formula $Ca_6[(AlO_2)_{12}(SiO_2)_{12}] \times H_2O$ and is commercialized under the name "molecular sieve 5A". This patent specifically limits the described process to using molecular sieve 5A. In fact, this patent states that "it is essential to use molecular sieve 5A as the adsorbent. By using molecular sieve or zeolite of a different class it is difficult to accomplish selective adsorption of only one of $NF_3$ and $CF_4$. If activated carbon, which is a popular adsorbent, is used both $NF_3$ and $CF_4$ are adsorbed." U.S. Pat. No. 5,069,887, col. 2, lines 9-14

Yet another example of a process utilizing a zeolite molecular sieve to separate $NF_3$ and $CF_4$ is disclosed in Pub. No. US2003/0221556 A1. In this patent, an erionite-type zeolite molecular sieve having an empirical formula $(Na,K)_9 Al_9Si_{27}O_{72} \times 27H_2O$ is disclosed and is used in a process similar to the one described in U.S. Pat. No. 5,069,887.

All of these methods suffer from the severe disadvantage that the adsorbent adsorbs the targeted product (namely $NF_3$) instead of the relatively small amounts of impurities contaminating the $NF_3$. Since the product is adsorbed instead of the impurities, such processes require large amounts of adsorbent relative to the amount of $NF_3$ produced. In addition, large amounts of energy are required to release the bound $NF_3$ from the adsorbent. The low efficiency associated with these purification methods correlates to a high economic cost in obtaining a purified $NF_3$ product.

The present invention overcomes these and other shortcomings of the methods found in the prior art.

SUMMARY OF THE INVENTION

The present invention relates to methods for purifying $NF_3$ preferably including the steps of (a) providing a crude product comprising $NF_3$ and at least one impurity; (b) contacting the crude product with an adsorbent comprising a polyacrylonitrile-based carbon molecular sieve; and (c) separating the $NF_3$ from the adsorbent to produce a purified $NF_3$ product having a lower concentration of the impurity relative to the crude product. Applicants have discovered that the preferred methods of the present invention provide selective adsorption of certain impurities, such as $CF_4$, relative to $NF_3$. Accordingly, $NF_3$ can be efficiently purified without the need for excessive adsorbents.

Another aspect of the present invention provides a system for purifying $NF_3$, comprising (a) a crude product feed stream comprising $NF_3$ and at least one impurity; (b) an adsorbent comprising a polyacrylonitrile-based carbon molecular sieve that is in contact with the feed stream; and (c) a purified $NF_3$ product stream having a lower concentration of the impurity relative to the feed stream.

BRIEF DESCRIPTION OF THE DRAWING

FIG. 1 is a diagrammatic illustration of an embodiment of a system for purifying $NF_3$ according to the present invention.

DETAILED DESCRIPTION

Applicants have discovered an efficient process for purifying $NF_3$ whereby impurities, such as $CF_4$, are removed from a crude product via adsorption without the adsorption of significant amounts of $NF_3$. As used herein, the term "crude product" refers broadly to a product having $NF_3$ and a concentration of impurities higher than is desired. The present invention, especially when combined with other separation techniques, is capable of producing a $NF_3$ product with an impurity level, particularly a $CF_4$ impurity level, that would be extremely costly and difficult, if not impossible, to achieve using conventional processes.

Thus, one aspect of the present invention is a method of purifying $NF_3$ that includes the step of providing a crude product comprising $NF_3$ and at least one impurity at a concentration greater than is desired. According to a preferred embodiment, impurities in the crude product include at least $CF_4$.

In certain preferred embodiments, the step of providing the crude product comprises simply obtaining from a commercially available source of crude $NF_3$ in an amount and at a rate required for the desired operation. Nitrogen trifluoride is commercially available in different purities from various vendors. Alternatively, crude $NF_3$ may be provided directly to the present purification process as part of an integrated $NF_3$ production facility.

Nitrogen trifluoride manufacturing processes typically produce crude $NF_3$ streams containing varying levels of $CF_4$ impurity. Crude $NF_3$ commonly contains from about 100 ppm to about 2 volume percent $CF_4$ and such crude products are suitable for purification in accordance with the present invention, although wider ranges of $CF_4$ concentrations, for example 4 ppm to 5 volume percent or higher, can also be purified by the present invention. It is expected that a crude product having any concentration of impurities can be processed according to the claimed invention, provided that adequate bed size and flow rate are utilized.

The crude product of present invention can be in any phase including gas, liquid, supercritical, or some combination of these. The vapor pressure of $NF_3$ at various temperatures is well known and will determine the phase of the $NF_3$ being processed. For example, at atmospheric pressure (760 mm Hg) $NF_3$ has boiling point of $-129.1°$ C. Thus, according to one embodiment of the present invention, the $NF_3$ is maintained at about atmospheric pressure and a temperature of below about $-129.1°$ C., resulting in a liquid phase operation. Nitrogen trifluoride in a liquid phase may also be achieved by conducting the process at a sufficient pressure and below $NF_3$'s critical temperature of $-39.3°$ C.

Another step of this aspect of the invention comprises contacting the crude product with an adsorbent comprising a polyacrylonitrile-based carbon molecular sieve wherein the adsorbent selectively adsorbs one or more impurities in the crude product but does not adsorb $NF_3$ to any substantial degree. The selectivity of a molecular sieve can, in general, be evaluated by comparing the molecular size and the pore diameter. Although it is known that an interrelation exists between the geometry of the sieve elements, their composition, and their retention properties, the exact nature of this interrelationship is not currently known. Thus, the selection of a specific molecular sieve must be determined based upon empirical data. (See e.g. Martin Harper, *Sorbent Trapping of Volatile Organic Compounds from Air*, J. CHROMATOGRAPHY A, 885 (2000) p.129-151 ("Many kinds of carbon molecular sieves are available (e.g., Carbosieve S-III, Carboex 1000, Carboxen 1003, Spherocarb, Anasorb CMS [31.96,100]). Retention volume studies have indicated large differences between these sorbents. Whether this relates to a practical difference is uncertain at this time. Until comparisons are carried out it is advisable not to treat sorbents as equivalents, and to use only the material evaluated in the specific method." (Emphasis added).)

Preferably, the adsorbant of the above-mentioned sieve exists as beads that can disposed in a bed or in a packed column, preferably creating a mesh size from about 60 to about 100. These beads preferably have a pore size of from about 10 Å to about 16 Å, even more preferably about 13 Å, and have a surface area of about 500 $m^2/g$ to about 1500 $m^2/g$, even more preferably about 1000 $m^2/g$. Polyacrylonitrile-based carbon molecular sieves according to the present invention are commercially available as Carbosphere® from Alltech Associates, Inc.

The contacting step can be conducted via a continuous process, a batch process, or a combination of continuous and batch processes. For certain preferred embodiments, the contacting step comprises a continuous processes wherein the crude product, in a vapor phase, a liquid phase, or in a stream containing both liquid and vapor phases, is passed over or through the adsorbent. The quantity and arrangement of the adsorbent is such that it can effectively reduce the concentration of impurities below a desired level. In general, it is preferred that the adsorbent be arranged as a packed column, a fluidized bed, a static bed, or some combination thereof. Generally, the methods of the present invention are conducted at an operating pressure of from about 0 to about 200 psig.

The extent of adsorption of impurities by the adsorbent correlates to the amount of time the crude product is in contact with the adsorbent. For embodiments that include $CF_4$ as an impurity, contact time is preferably from about 1 to about 100 seconds, and more preferably from about 15 to about 25 seconds. In continuous processes, contact time is determined by the flow rate of the fluid over or through the adsorbent. In batch processes, contact time is determine by the duration of the operating cycle.

The flow rate at which the crude product must be passed through the adsorbent bed or packed column in order to achieve a specific adsorption is based on the amount and orientation of the adsorbent, which in turn is based on the other particular process and product requirements. In addition, the flow rate is based on the concentration of impurities in the crude product and the desired level of impurities in the final purified product. All other parameters held constant, higher purity levels generally require lower flow rates so that the residence time of the fluid in contact with the adsorbent is increased. The required flow rate and other process parameters necessary to achieve a particular product purity according to the present invention would be readily known to one skilled in the art without undue experimentation.

According to a third step of this aspect of the invention, $NF_3$ is separated from the adsorbent to produce a purified $NF_3$ product. As used herein the term "purified $NF_3$ product" refers to a composition consisting essentially of $NF_3$ wherein the concentration of any particular impurity in the composition is lower than the concentration of the impurity relative to the crude product. Those skilled in the art will appreciate that the desired maximum amount of a given impurity will vary widely depending on numerous factors, including the impurity involved and the expected use of the purified $NF_3$ product. For example, electronics grade $NF_3$ preferably contains less than 500 ppm of $CF_4$, while VSLI (very-large-scale-integration) grade $NF_3$ preferably contains less than 20 ppm of $CF_4$.

Preferred embodiments of the present achieve a purified $NF_3$ product having less than 10 ppmv (parts-per-million based upon total volume) concentration of $CF_4$, and even more preferably less than 1 ppmv. As will be appreciated, such extremely low levels of $CF_4$ impurities in a purified $NF_3$ product are difficult, if not impossible, to economically obtain with conventional processes in large scale commercial operations. However, the present invention is not limited to producing only ultra-pure $NF_3$; it may also be used to great advantage in the production of $NF_3$ products with higher allowable $CF_4$ concentrations, for example as high as 5 volume percent. In such embodiments, it is contemplated that the present invention will permit the purification of such materials at extremely high rates and/or at relatively low costs in comparison to conventional processes.

Separation of the adsorbent from the $NF_3$ is accomplished by physically removing the purified $NF_3$ product from the presence of the adsorbent. For example, in a continuous process, the purified $NF_3$ product may be displaced from the adsorbent by creating a pressure differential across the adsorbent (i.e. by regulating a crude product stream at a pressure higher than the pressure of the purified product stream). In a batch process, the purified $NF_3$ product may be displaced from the adsorbent by removing the adsorbent from the vessel containing the purified product or by pressure, provided that the pressure differential is not so large as to being desorbing the $CF_4$.

As the purification process proceeds, impurities, particularly $CF_4$, accumulate in the adsorbent material. The purified $NF_3$ product may be produced until the adsorbent reaches its limit of saturation. As the bed becomes saturated with impurities, the level of impurities in the finished product begins to increase, at which time the adsorbent material is either replaced or, preferably, regenerated.

Replacement or regeneration is preferably performed before the occurrence of "breakthrough". In general, "breakthrough" is deemed to have occurred when the level of a targeted impurity in the purified stream exceeds a desired maximum. For example, when a product has a predetermined maximum impurity of 10 ppm $CF_4$, then the breakthrough concentration is set at 10 ppm. When a product having less than 1 ppm $CF_4$ is desired, the breakthrough concentration is set at 1 ppm, and so forth.

For embodiments in which two or more beds are used in series, it is contemplated that the level of impurity at the exit of the first bed could well exceed the "breakthrough" level since the one or more subsequent bed(s) in the series would create a buffer zone to ensure that the partially purified $NF_3$ leaving the first bed will obtain the desired purity by subsequent contact with an unsaturated adsorbent. In such embodiments, the first bed is generally taken off-line and a newly regenerated bed would be introduced to the series arrangement. Alternatively, in certain preferred embodiments involving continuous operations, purification is performed via two packed columns arranged in parallel so that at least one column is continually used for purification operations while the other column is regenerated offline.

Regeneration of polyacrylonitrile-based carbon molecular sieves is well-understood. This regeneration can be accomplish via conventional means such as, for example, heating the adsorbent to a temperature from about 50° C. to about 200° C., preferably under vacuum. Other regeneration techniques involve flushing the adsorbent with an inert gas, such as $N_2$. The particular inert gas and/or level of vacuum required to regenerate the adsorbent would be known to those skilled in the art.

Another aspect of the present invention is an apparatus for purifying $NF_3$. Referring to FIG. 1, an embodiment of this aspect of the invention is shown wherein a source of $NF_3$ crude product 10 is connected to a polyacrylonitrile-based carbon molecular sieve 21 which is, in turn, connected to a $NF_3$ purified product outlet 30. In a preferred embodiment, the polyacrylonitrile-based carbon molecular sieve 21 includes one packed column, a fluidized bed, a static bed, or some combination thereof. In another preferred embodiment, the polyacrylonitrile-based carbon molecular sieve 21 includes multiple packed columns or beds in series or in parallel.

In a preferred embodiment, the apparatus is designed to accommodate a continuous purification process. For example, the source of $NF_3$ crude product may originate from a vessel 11 and pass through a pressure regulating valve 12 prior to entering the molecular sieve 21. To increase the exposure time of the crude product to the adsorbent, a back pressure may be created by restricting the flow through valve 31.

The present invention may also be performed as part of a process in which purified $NF_3$ is added to a chemical reaction, preferably as part of a commercial process. That is, an in-line purification process may be provided as part of a step to supply high purity $NF_3$ to a chemical reaction.

The following examples are illustrative of the invention, though the invention is not limited to these examples.

EXAMPLES

Example 1

Ten grams of CARBOSPHERE® carbon molecular sieve with a mesh size of 60/80 was dried in a 100° C. vacuum oven before use. This material was loaded into a 300 mL stainless steel cylinder and pressurized to about 23 Pisa with a crude product containing $NF_3$ having approximately 1995 ppmv $CF_4$ impurity. After about 2.3 hours, the gas in the cylinder was analyzed by gas chromatography and was found to contain less than 1 ppmv $CF_4$. This example demonstrates that CARBOSPHERE® carbon molecular sieves are much more selective for the adsorption of $CF_4$ than for $NF_3$. This example further demonstrates that CARBOSPHERE® molecular sieves c an be used to effectively reduce $CF_4$ impurities in an $NF_3$ gas composition.

Example 2

The procedure in Example 1 was followed, except that 9.8 grams of CARBOSPHERE® molecular sieve were loaded into the cylinder and a crude product containing $NF_3$ with approximately 2.3 vol. % $CF_4$ was charged into the cylinder at a pressure of about 25 Pisa. After about 2.1 hours, the gas inside the cylinder was analyzed by gas chromatography and was found to contain 0.12 volume percent $CF_4$.

Example 3

Twenty-five grams of CARBOSPHERE® carbon molecular sieve with a mesh size of 60/80 was dried in a 100° C. vacuum oven before use. This material was then loaded into a copper tube that measured 12 inches long by ¾ inches in diameter. A crude product of $NF_3$ containing 195 ppmv of $CF_4$ was then flowed through the adsorbent bed at a pressure of 14.7 psi. After 11 minutes the outlet stream was analyzed by gas chromatography and was found to contain less than 1 ppmv $CF_4$.

Having thus described a few particular embodiments of the invention, various alterations, modifications, and improvements will readily occur to those skilled in the art. Such alterations, modifications, and improvements, as are made obvious by this disclosure, are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A process for purifying $NF_3$ comprising the steps of:
   (a) providing a crude product comprising $NF_3$ and a $CF_4$ impurity, wherein said impurity is present at a first concentration;
   (b) contacting said crude product with an adsorbent comprising a polyacrylonitrile-based carbon molecular sieve, wherein said molecular sieve adsorbs at least a portion of said CF4 impurity; and
   (c) separating said $NF_3$ from said adsorbent to produce a purified $NF_3$ product having a second concentration of said impurity, wherein said second concentration is lower than said first concentration.

2. The process of claim 1, wherein said adsorbent comprises beads having a surface area to weight ratio of from about 500 $m^2$/g to about 1500 $m^2$/g and a pore size of from about 10 Å to about 15 Å.

3. The process of claim 2, wherein said beads have a surface area to weight ratio of about 1000 $m^2$/g and a pore size of about 13 Å.

4. The process of claim 3, wherein said first concentration of $CF_4$ is from about 4 ppmv to about 5 volume percent.

5. The process of claim 4, wherein said first concentration of $CF_4$ is from about 100 ppmv to about 2 volume percent.

6. The process of claim 1, wherein said second concentration is less than 1 ppmv.

7. The process of claim 1, wherein said contacting step has a duration of about 1 to about 100 seconds.

8. The process of claim 7, wherein said duration is from about 15 to about 25 seconds.

9. The process of claim 1, wherein said crude product comprises a gas.

10. The process of claim 1, wherein said crude product comprises a liquid.

11. A system for continuously purifying $NF_3$ comprising:
   (a) a crude product feed stream comprising $NF_3$ and a $CF_4$ impurity, wherein said impurity is present at a first concentration;
   (b) an adsorbent comprising a polyacrylonitrile-based carbon molecular sieve that is in contact with said feed stream; and
   (c) a purified $NF_3$ product stream having a second concentration of said impurity, wherein said second concentration is lower than said first concentration.

12. The system of claim 11, wherein said crude product feed stream contains from about 4 ppmv to about 5 volume percent $CF_4$.

13. The system of claim 11, wherein said second concentration is less than 1 ppmv.

14. The system of claim 11, wherein said molecular sieve comprises a packed column, a fluidized bed, a static bed, or some combination thereof.

15. The system of claim 14, wherein said molecular sieve comprises a mesh size of from about 60 to about 100.

16. The system of claim 14, wherein said molecular sieve comprises at least two packed columns arranged in parallel.

* * * * *